US009710789B2

(12) United States Patent
Chinnappan et al.

(10) Patent No.: US 9,710,789 B2
(45) Date of Patent: Jul. 18, 2017

(54) MULTI-DIMENSION ANALYZER FOR ORGANIZATIONAL PERSONNEL

(71) Applicants: Balasubramanian Chinnappan, Foster City, CA (US); David Hsia, San Francisco, CA (US); Scott McGhee, San Ramon, CA (US); Kai Xu, Los Altos, CA (US)

(72) Inventors: Balasubramanian Chinnappan, Foster City, CA (US); David Hsia, San Francisco, CA (US); Scott McGhee, San Ramon, CA (US); Kai Xu, Los Altos, CA (US)

(73) Assignee: SuccessFactors, South San Francisco, CA (US)

(*) Notice: Subject to any disclaimer, the term of this patent is extended or adjusted under 35 U.S.C. 154(b) by 431 days.

(21) Appl. No.: 13/909,853

(22) Filed: Jun. 4, 2013

(65) Prior Publication Data
US 2014/0358807 A1 Dec. 4, 2014

(51) Int. Cl.
G06F 3/048 (2013.01)
G06Q 10/10 (2012.01)
G06Q 10/06 (2012.01)

(52) U.S. Cl.
CPC ......... *G06Q 10/105* (2013.01); *G06Q 10/06* (2013.01)

(58) Field of Classification Search
CPC .......................... G06Q 90/00; G06T 11/206
See application file for complete search history.

(56) References Cited

U.S. PATENT DOCUMENTS

| 5,894,311 | A  | * | 4/1999  | Jackson ............ G06F 17/30398 345/440 |
| 7,085,994 | B2 |   | 8/2006  | Gvily |
| 7,086,013 | B2 |   | 8/2006  | Saund et al. |
| 7,143,091 | B2 |   | 11/2006 | Charnock et al. |
| 7,668,746 | B2 |   | 2/2010  | Eisma et al. |
| 7,801,755 | B2 |   | 9/2010  | Doherty et al. |
| 8,108,320 | B2 |   | 1/2012  | Sperle et al. |

(Continued)

FOREIGN PATENT DOCUMENTS

EP 1457909 A2 9/2004

OTHER PUBLICATIONS

Extended European Search Report dated Aug. 1, 2014 for European patent application No. 14001774.0.

(Continued)

*Primary Examiner* — Matthew Ell
*Assistant Examiner* — Mohamed Abou El Seoud
(74) *Attorney, Agent, or Firm* — Mintz Levin Cohn Ferris Glovsky and Popeo, P.C.

(57) ABSTRACT

An organizational chart view can include a plurality of icons each representing a person in an organization that are arranged to reflect a hierarchical organizational structure of the organization. A received first user input can include designation of two or more of the plurality of icons as part of a selected population, and a received second user input can include a selection of an analytical view to be applied to the selected population. The organizational chart view can be morphed to the selected analytical view, for example by generating animation effects to translate the plurality of icons in the selected population to form the selected analytical view.

14 Claims, 13 Drawing Sheets

(56) References Cited

U.S. PATENT DOCUMENTS

| | | | |
|---|---|---|---|
| 8,209,633 B1* | 6/2012 | Eismann | G06F 8/34 |
| | | | 345/473 |
| 8,260,812 B2 | 9/2012 | Rieger | |
| 8,280,822 B2 | 10/2012 | McKeown et al. | |
| 8,396,827 B2 | 3/2013 | Gross et al. | |
| 2002/0104096 A1 | 8/2002 | Cramer et al. | |
| 2004/0111431 A1 | 6/2004 | Zeller et al. | |
| 2004/0243422 A1 | 12/2004 | Weber et al. | |
| 2007/0233585 A1 | 10/2007 | Ben Simon et al. | |
| 2008/0091441 A1 | 4/2008 | Flammer et al. | |
| 2009/0096812 A1 | 4/2009 | Boixel et al. | |
| 2009/0276296 A1* | 11/2009 | Spriegel | G06Q 10/0639 |
| | | | 705/7.38 |
| 2009/0276297 A1* | 11/2009 | Ehrler | G06Q 10/06398 |
| | | | 705/7.42 |
| 2011/0184962 A1 | 7/2011 | Palmer et al. | |
| 2011/0191343 A1 | 8/2011 | Heaton et al. | |
| 2012/0271775 A1 | 10/2012 | Bell et al. | |
| 2012/0311497 A1* | 12/2012 | Bear | G06Q 10/00 |
| | | | 715/823 |
| 2013/0061128 A1 | 3/2013 | Lucco et al. | |

OTHER PUBLICATIONS

Notice from the European Patent Office dated Oct. 1, 2007 concerning business methods.

* cited by examiner

MULTI-DIMENSION ANALYZER FOR ORGANIZATIONAL PERSONNEL

TECHNICAL FIELD

The subject matter described herein relates to one or more features of organizational analysis tools, for example for reviewing characteristics of organizational personnel in multiple dimensions.

BACKGROUND

Managers, supervisors, executive level employees, or the like of an organization typically perform tasks relating to reviewing, comparing, etc. one or more metrics related to the individuals in the organization. However, currently available solutions do not generally include capabilities for supporting rapid selections of people in the organization both vertically and horizontally to compare different metrics related to each individual or to allow analyses based on user-designated parameters or groupings.

SUMMARY

One or more implementations of the current subject matter can include features relating to the use of graphical user interfaces for review, selection, and optionally manipulation of characteristics or other information relevant to people in an organization. In some examples, a user experience can be improved through the use of animated graphics that morph a first view, such as for example an organizational chart view, of icons representing people in the organization into a second view, such as for example an analytical view for comparing, reviewing, etc. people within the organization.

In one aspect, a method includes rendering an organizational chart view for display on a display device. The organizational chart view includes a plurality of icons that each represents a person in an organization. The plurality of icons are arranged to reflect a hierarchical organizational structure of the organization. The method further includes receiving a first user input that includes designation of two or more of the plurality of icons as part of a selected population and receiving a second user input that includes a selection of an analytical view to be applied to the selected population. The organizational chart view is morphed to the selected analytical view. The morphing includes generating animation effects to translate the plurality of icons in the selected population to form the selected analytical view.

In some variations one or more of the following can optionally be included in any feasible combination. For example, the first user input and the second user input can be received via at least one user input device. The first user input can include creation of a drag selection area that overlaps at least one of the two or more of the plurality of icons. The morphing can be performed without a page reload such that a user can visually track the translating of the plurality of icons in the selected population as they form the selected analytical view. A method can further include receiving a third user input that can include a new selection of a different analytical view to be applied to the selected population and morphing the analytical view to the different analytical view without requiring new user designation of the selected population. A method can further include returning to the organizational chart view, and this returning can include morphing the analytical view back to the organizational chart view. A new user input that can include a change to the selected population can be received via organizational chart view.

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
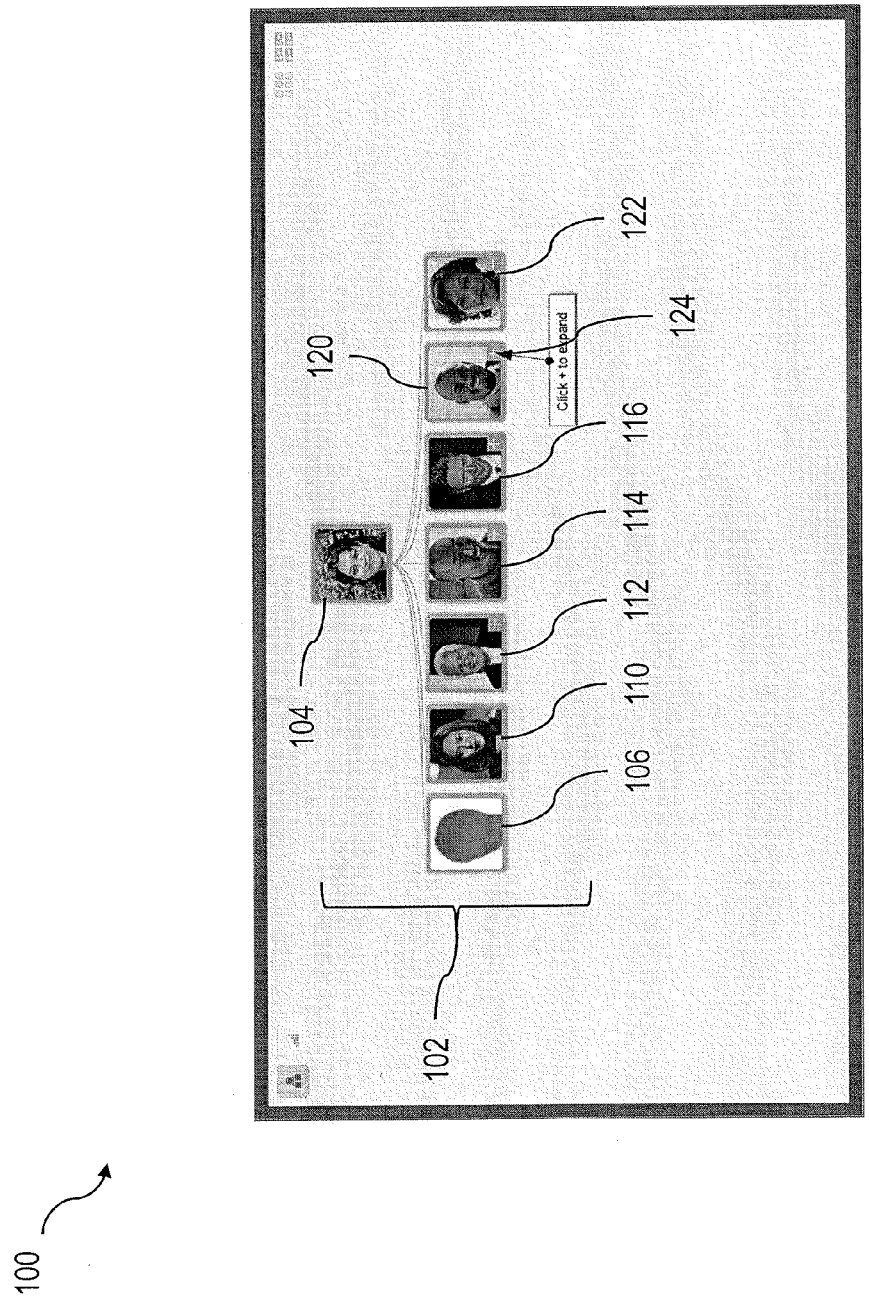
FIG. 1 shows a first screenshot view illustrating features consistent with one or more implementations of the current subject matter.

Currently available approaches to presenting, organizing, reviewing, comparing etc. information about people in an organization can typically display one or more analytical or informational views that can be displayed for all people in the organization. However, performing comparisons among a subset of people in the organization, in particular when the people are not all within a sub-unit of the organizational hierarchy or otherwise related by similar job titles, positions, etc. can be less intuitive for a user using existing approaches. In some cases, a text-based search engine or other filter or tool may be the best available existing solution. However, such capabilities lack the benefits that can be provided by enabling a user to make selections of people to be reviewed or compared directly from a visual depiction of an organizational hierarchy. As used herein, the term "user" refers broadly to a manager, supervisor, executive level employee or executive, or other user of an approach having one or more features as described herein.

Consistent with implementations of the current subject matter, a user can select a population of persons (referred to throughout this disclosure as a "selected population") from a displayed view of an organizational chart using one or more selection operations (described in more detail below) that can be analogous to user interface inputs applicable in a "desktop" graphical user interface. The displayed view can include at least part of an organizational chart that represents all or part of a hierarchy structure of an organization. As used in this disclosure, the term "organizational chart" refers to either of an organizational chart representing an entire hierarchy structure or some part of the hierarchy structure. Population selection using an organizational chart view approach as described herein can allow a user to designated a selected population randomly or by selecting specific persons using their representative icons on the organization chart view.

A user can make use of one or more features as described elsewhere herein via interactions with a user interface, which can be displayed on a screen, a projector, or any kind of visual display device usable with a computing device. The user interface can include as an entry point a graphical depiction of an organizational chart (an "organizational chart view") that represents all or part of a hierarchy of people or positions within an organization or part of an organization. For the purposes of this disclosure, the term "organization" should be interpreted broadly as referring to any type of organizational unit (e.g. a company, a division, a work group, a department, etc.).

An organizational chart view consistent with implementations of the current subject matter can take any of several forms consistent with diagrams that show the hierarchy structure of an organization; relationships and relative ranks of its parts and positions, jobs, etc.; and the like. Consistent with implementations of the current subject matter, an organizational chart view can include icons that each represents an individual person, or optionally, a group of people in the organization. In some examples, the icons can include an avatar, which can optionally include a photograph of the represented person's face. The icons can alternatively or additionally include the represented person's or group's name, position description, other identifying information, or the like. The icons can be arranged into an organizational chart structure in the organizational chart view. The organizational chart structure can in some examples resemble those shown in the figures associated with this disclosure. However, other implementations are within the scope of the current subject matter. The associated figures are not meant to be limiting.

The one or more selection operations can include, without limitation, any of a variety of icon selection approaches including, but not limited, to those typically available for selection of icons on a computer desktop user interface environment. For example, a selection of multiple icons grouped in a section of the organizational chart view can be selected using a selection operation that includes a drag selection area identified using a user input device (e.g. a mouse, a trackpad, a trackball, a touch screen, a pointer, or the like). The drag selection area can include a selection area that is rectangular, oval, circular, or any other shape, and can be formed in one example by a click (or select), hold, and drag sequence using the user input device. As used herein, any type of selection made by a user input device that indicates a point or area on a screen through one or more physical gestures (e.g. movement of a mouse, finger motions on a trackpad, touching or swiping or tapping or the like on a touch screen or touch pad, etc.) by a user is generically referred to as a "click." Other user inputs performed with one or more user input devices can be used to designate a drag selection area that includes of one or more of the icons arranged in a currently displayed part of the organizational chart in an organizational chart view.

Alternatively or in addition, the selection operations can include selection of icons or groups of icons using inputs via a keyboard, optionally in combination with another user input device such as those discussed above. For example, a designated key or keys on the keyboard (e.g. a "control" key, a "shift" key, etc.), when held down by the user, can allow a subsequent input with another user input device on individual icons (or, alternatively to make a drag selection as discussed above) to toggle a selected or unselected state of that icons or those icons that are indicated by the subsequent user input device input. In this manner, an individual icon or a group including multiple icons can be selected even if the selected icon or icons are not located adjacent to an already selected icon or group of icons. Additionally, if a group of icons is selected using a drag selection area, one or more icon of the group of icons can be deselected in this manner. An alternative input from a user input device (e.g. a "right click" on user input devices as described above, a gesture or other finger motion on a touch pad or touch screen, etc.) can also be used to individually or group-wise select or deselect an icon or icons. In some examples, such an alternative input can optionally activate a contextual menu or otherwise allow some degree of increased granularity in selecting icons presented in an organizational chart view.

A selected population of persons represented by the icons selected as discussed above can be viewed and compared against different metrics by selecting from a grouping of available analytical views, which can include charts, tables, diagrams, etc. for presenting graphically, textually, via a combination of graphical display and text, etc. one or more comparisons between persons in the selected population. After selecting a chart, the user's selection reference will not be lost. Each icon in the selected population can smoothly and visually transition from its location in the organizational chart view to its position in the target analytical view without requiring a page refresh. Additionally, a user can "re-use" a selected population in a different analytical view without requiring a re-selection of icons. Furthermore, if the user wishes to modify or alter the selected population, for example by adding new icons or de-selecting those previously selected, these changes can be performed by revisiting the organizational chart view to create a new selected population based on the previous selected population as a starting point. A user can also view more information about a person by switching to a detailed view or by opening a quick information popup of the selected person, which can be accessed from the organizational chart view or from an analytical view that includes the icon corresponding to that person.

A transition between different views discussed herein (e.g. between an organizational chart view and an analytical view, between levels of visual expansion of the organizational chart view, between a first analytical view and a second analytical view, etc.) can occur in response to navigation based on user inputs selecting, requesting, etc. information across multiple dimensions relating to people in the organization represented by the organizational chart view. The animation effects can provide an improved frame of reference for the user. For example, transitional animation features can smoothly "morph" or otherwise move icons, images, other user interface elements, or the like from their screen positions in a first view to new screen positions in a second view to which the user has requested navigation through interactions with the user interface. Features of this nature can avoid forcing a user to re-orient on a newly loaded successive screen. These features and others will be better understood through reference to the example illustrated in the accompanying figures and discussed in further detail below.

The screenshot view 100 of FIG. 1 shows an example of an organizational chart view 102 consistent with implementations of the current subject matter. In some examples, user interface icons (e.g. avatars or other images representative of the people in the organizational hierarchy) can represent the people depicted in the organizational chart view 102. For example, the avatars 104, 106, 110, 112, 114, 116, 120, 122 can be photographs showing at least faces of the represented people. A further feature of the organizational chart view 102 can be a chart expansion user interface element 124 that indicates that further expansion of the organizational chart view 102 is possible. For example, the chart expansion user interface element 124 can be a plus sign (e.g. "+") or the like. A user input on or otherwise associated with the chart expansion user interface element 124 can cause expansion of the organizational chart view 102 to show additional people who are hierarchically arranged as subordinate to the person depicted in the corresponding icon 120. In this context, the term subordinate should be understood to refer to one or more people in the organization who report to or are otherwise managed, supervised, etc. by the people to whom they are subordinate.

Figure 2:
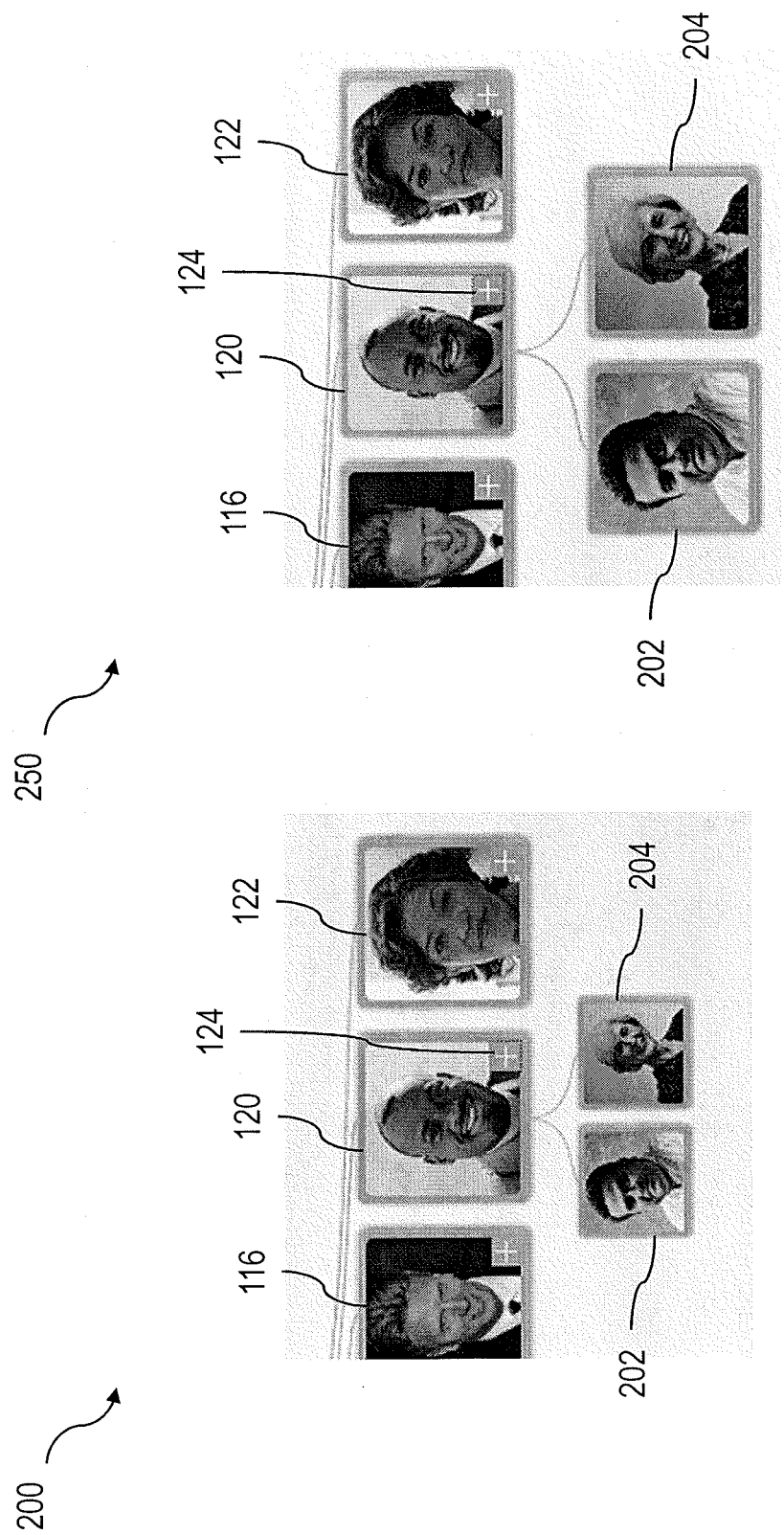
FIG. 2A and FIG. 2B show additional screenshot views illustrating features consistent with one or more implementations of the current subject matter.

FIG. 2A and FIG. 2B show screenshot views 200 and 250, respectively, illustrating features that can be included as part of an expansion of the organizational chart view 102 upon receipt of a user input associated with the chart expansion user interface element 124. As shown in FIG. 2A, upon receipt of a user input on or otherwise associated with the chart expansion user interface element 124 corresponding to the icon 120 representing a specific person in the organization chart 102, additional icons 202, 204 representing people subordinate to the specific person represented representing by the icon 120 can be displayed as hierarchically subordinate to the icon 120. The additional icons 202, 204 can morph from a smaller size, for example as shown in FIG. 2A to a full size as shown in FIG. 2B. In some examples, this morphing can include animation or other visual features that include the additional icons 202, 204 emerging from the icon 120, from behind the icon 120, etc.

Figure 3:
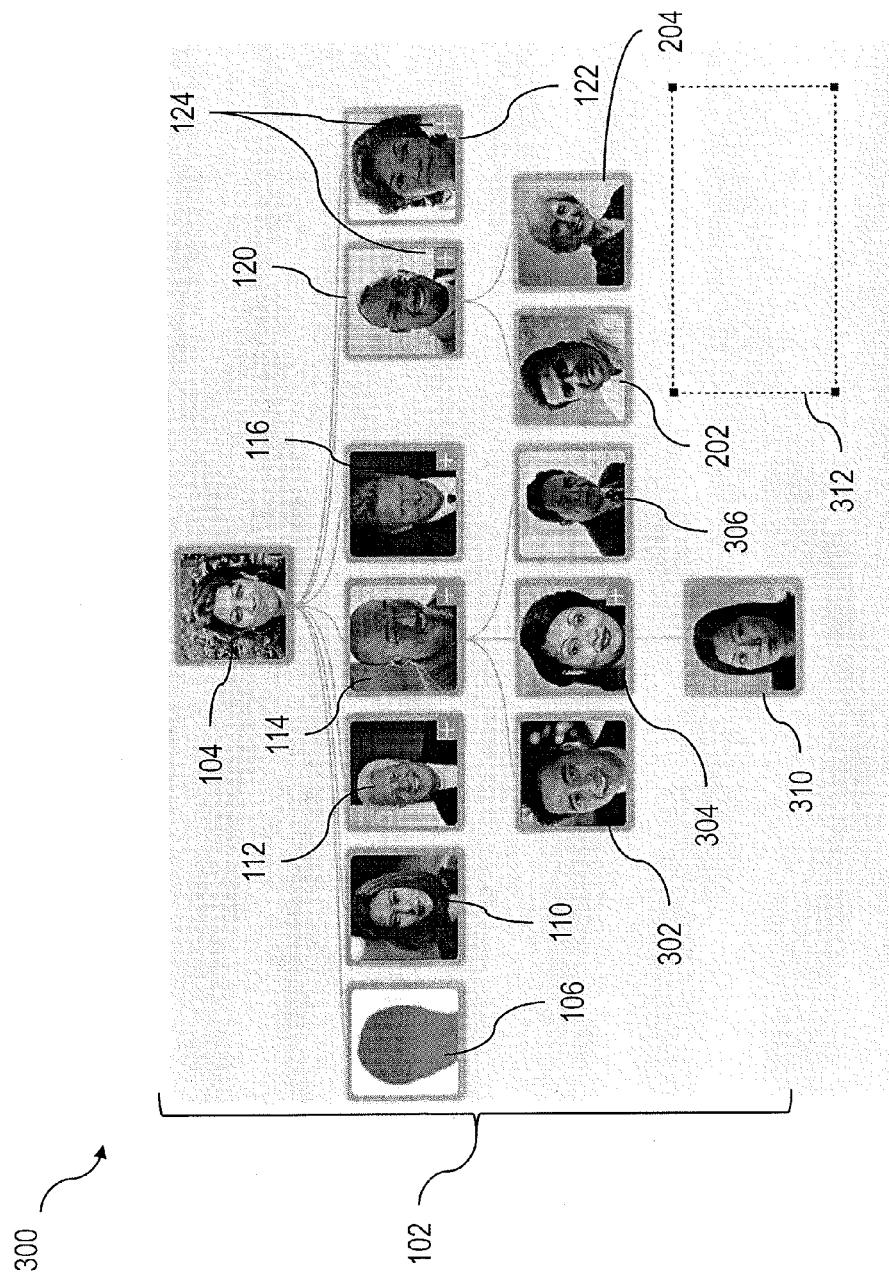
FIG. 3 shows another screenshot view illustrating features consistent with one or more implementations of the current subject matter.

FIG. 3 shows a screenshot view 300 of the organizational chart view 102 with the chart view expansion illustrated in FIG. 2A and FIG. 2B as well as additional expansion to show further details of the organization hierarchy subordinate to the person represented by the icon 114, which includes three subordinates 302, 304, 306 and an additional subordinate 310 to one of the subordinates 304. A drag selection area 312 is also shown. In the screenshot view 300 of FIG. 3, this drag selection area 312 has been created by a user clicking and holding at the point depicted as the lower right corner of the drag selection area 312 and dragging the cursor up and to the left. As noted above, this is only one example of how a drag selection area 312 can be created consistent with implementations of the current subject matter.

Figure 4:
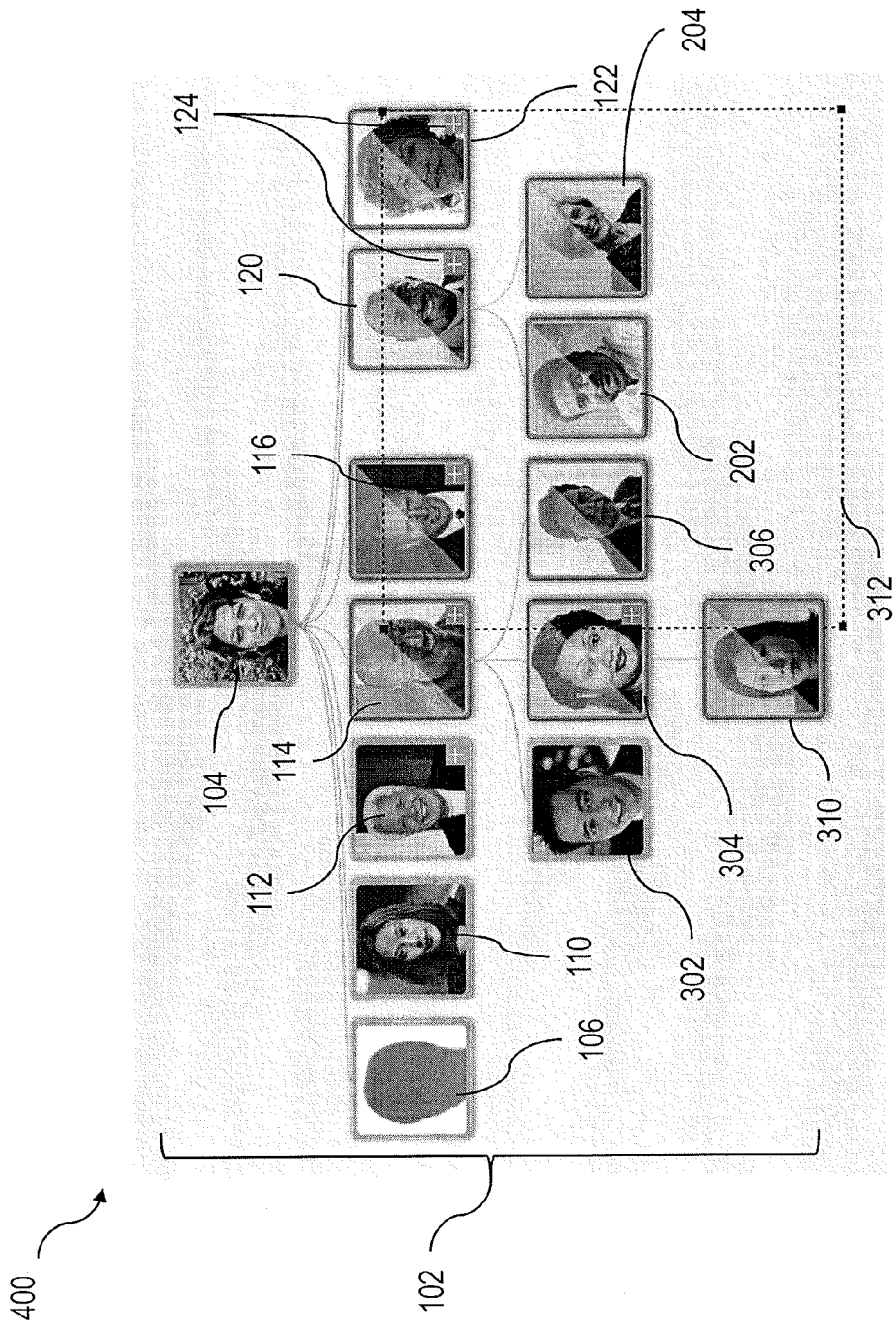
FIG. 4 shows another screenshot view illustrating features consistent with one or more implementations of the current subject matter.

In the screenshot view 400 of FIG. 4, the drag selection area 312 is further increased in size to overlap on the icons 114, 116, 120, 122, 202, 204, 304, 306, and 310. These icons then constitute a selected population. As noted above, the selected population can be further modified by one or more further inputs. For example, one of the icons in the selected population can be de-selected by a click on that icon while a specified key is depressed on a keyboard. An icon not in the selected population can be added to the selected population in a similar manner. A right click or other alternate input can also be used to de-select one or more icons from the selected population or to add one or more icons not in the selected population to the selected population. In still another example, an additional user input, such as for example a right click, a keyboard input, or the like, can enable a user to create a second drag selection area to add additional icons to the selected population even when those additional icons are not adjacent to the icons selected using a first drag selection area.

Figure 5:
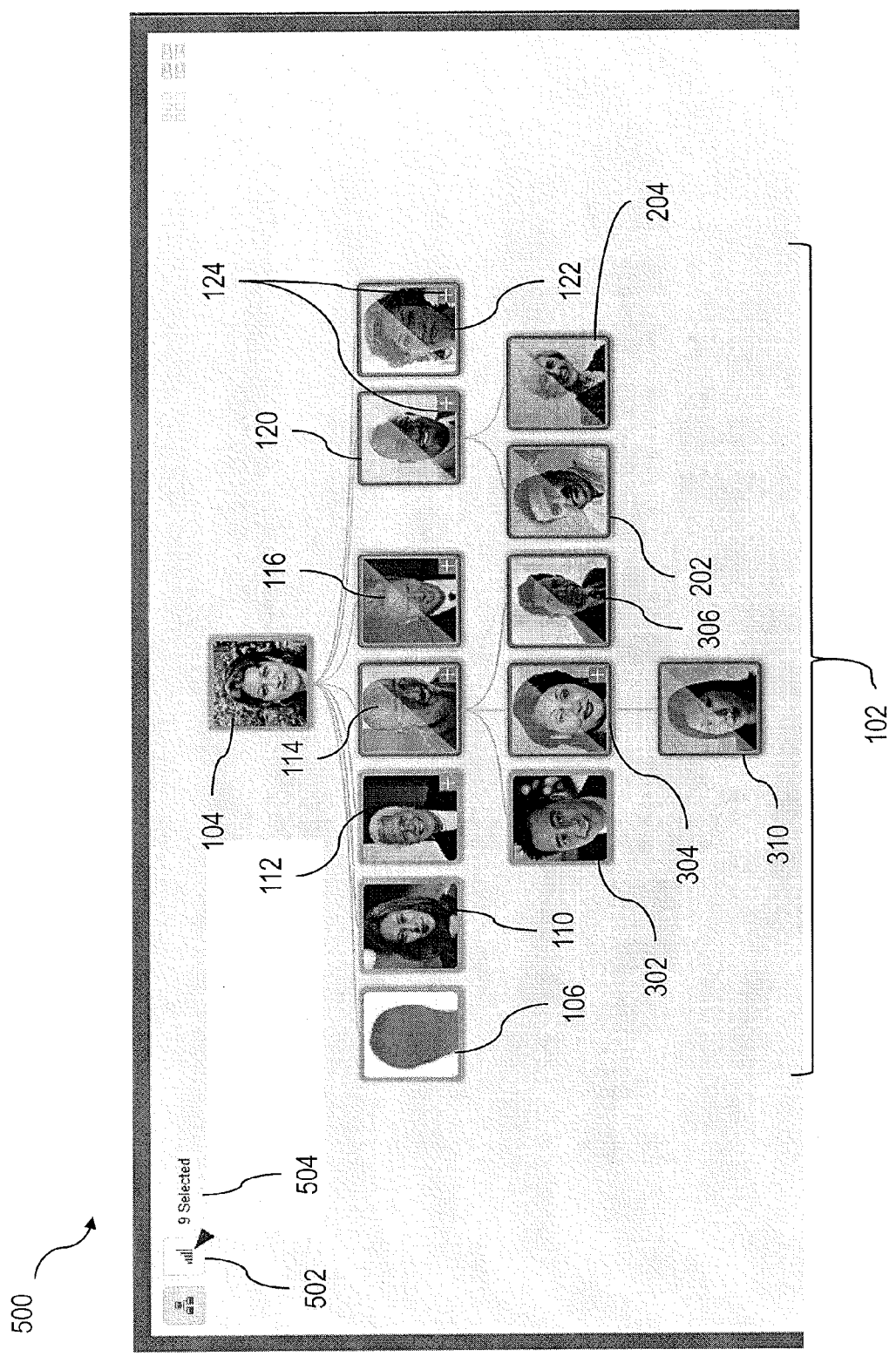
FIG. 5 shows another screenshot view illustrating features consistent with one or more implementations of the current subject matter.
Figure 6:
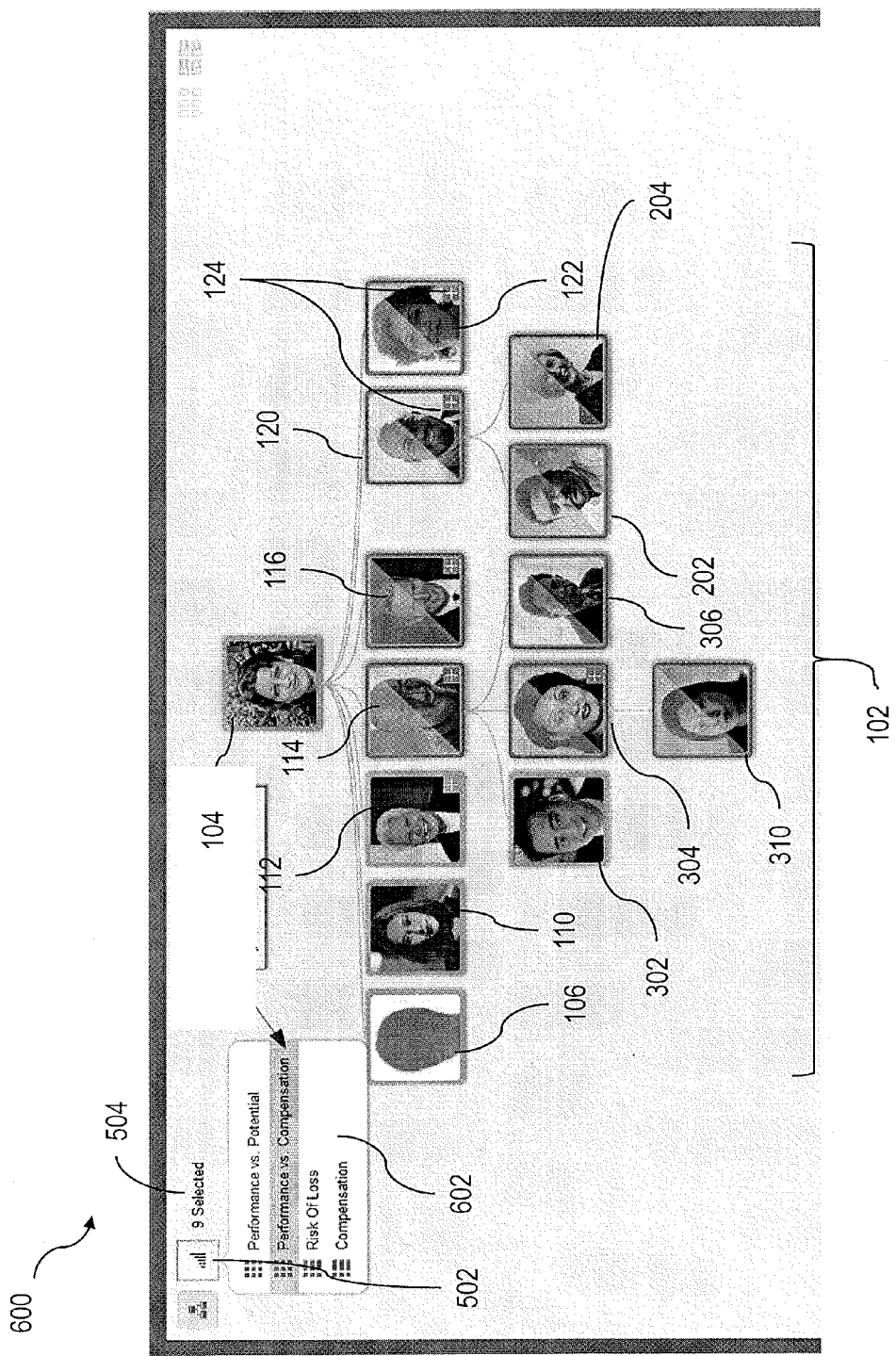
FIG. 6 shows another screenshot view illustrating features consistent with one or more implementations of the current subject matter.

The icons in the selected population can be identified by a visual indication, which can include, but is not limited to, one or more of shading, highlighting, a change in color or brightness, an emphasizing border, etc. For example, the screenshot view 500 of FIG. 5 shows the selected population such that the icons 114, 116, 120, 122, 202, 204, 304, 306, and 310 are displayed with a highlighting effect. The screenshot view 600 of FIG. 6 illustrates how activation of this control 502 can cause display of a pull-down menu 602 listing available analytical views.

FIG. 5 shows another screenshot view 500 illustrating the result of the selection of a population of icons shown in FIG. 4. Also shown is a control 502, which can include a user interface element such as a button, a pull-down menu, or the like, that can be displayed or activated for use after at least one icon is selected as part of the selected population. Optionally, a textual or graphical summary, such as for example the text summary 504 shown in FIG. 5 can be displayed to indicate the number of icons in the selection population.

FIG. 7, FIG. 8, FIG. 9, FIG. 10, and FIG. 11 illustrate features consistent with an example of the morphing effect discussed above. Upon selection by a user of an analytical view, for example via the control 502, the organizational chart view 102 can morph to one or more selected analytical views. By moving the icons representative of the selected population around the screen through animation effects without requiring a page refresh, a smoother information delivery experience can be provided for a user.

Figure 7:
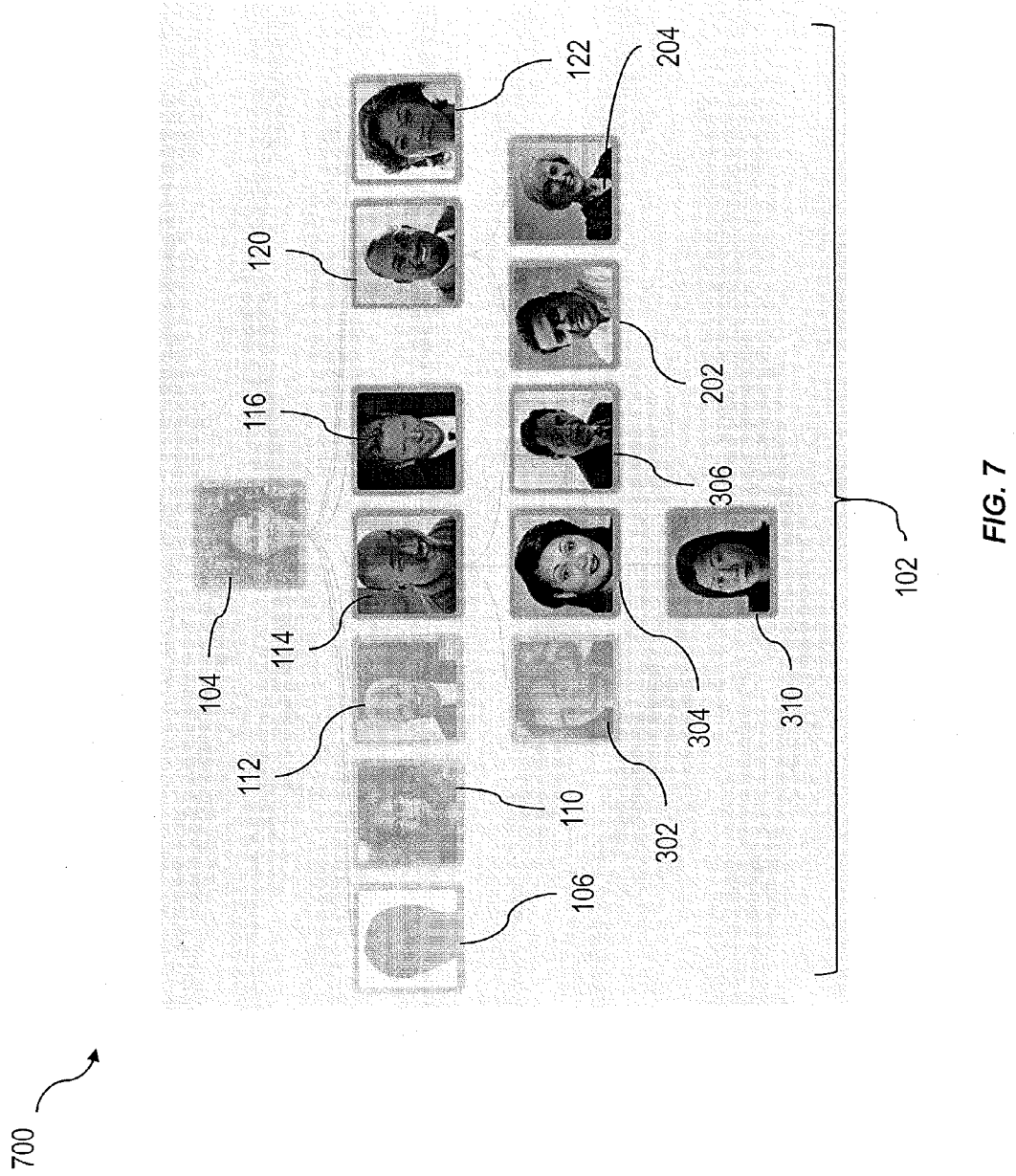
FIG. 7 shows another screenshot view illustrating features consistent with one or more implementations of the current subject matter.
Figure 8:
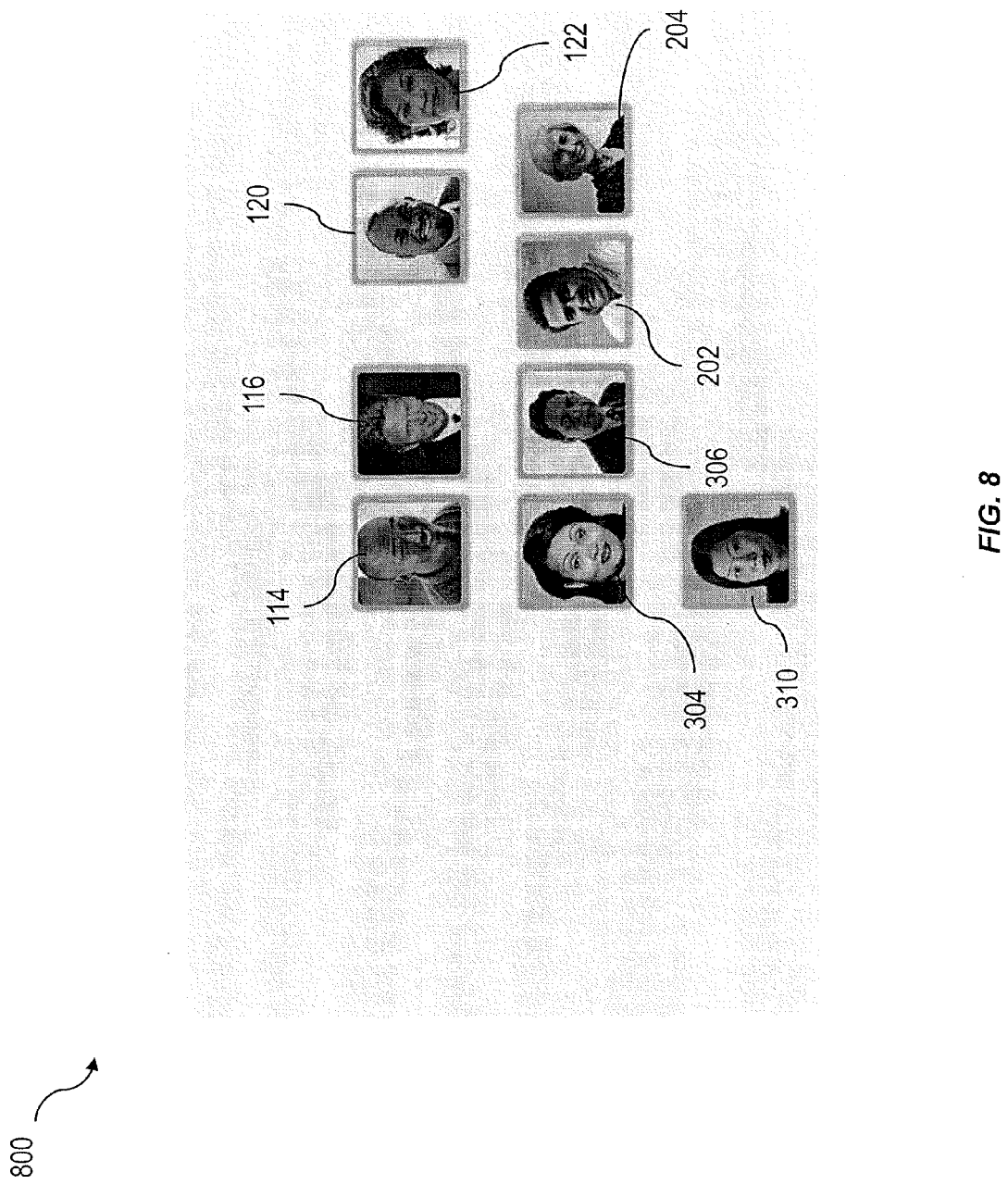
FIG. 8 shows another screenshot view illustrating features consistent with one or more implementations of the current subject matter.

The screenshot views 700 and 800 of FIG. 7 and FIG. 8 illustrate example of part of the morphing of the organizational view 102 after user selection of an analytical view using the control 502. As shown, the icons 104, 106, 110, 112, and 302 that are not part of the selected population can fade out to become invisible while the icons 114, 116, 120, 122, 202, 204, 304, 306, and 310 of the selected population remain temporarily unchanged. As shown in the screenshot view 800 of FIG. 8, the connecting lines of the organizational chart view can also disappear, and the visual indication associated with the icons 114, 116, 120, 122, 202, 204, 304, 306, and 310 of the selected population can be eliminated.

Figure 9:
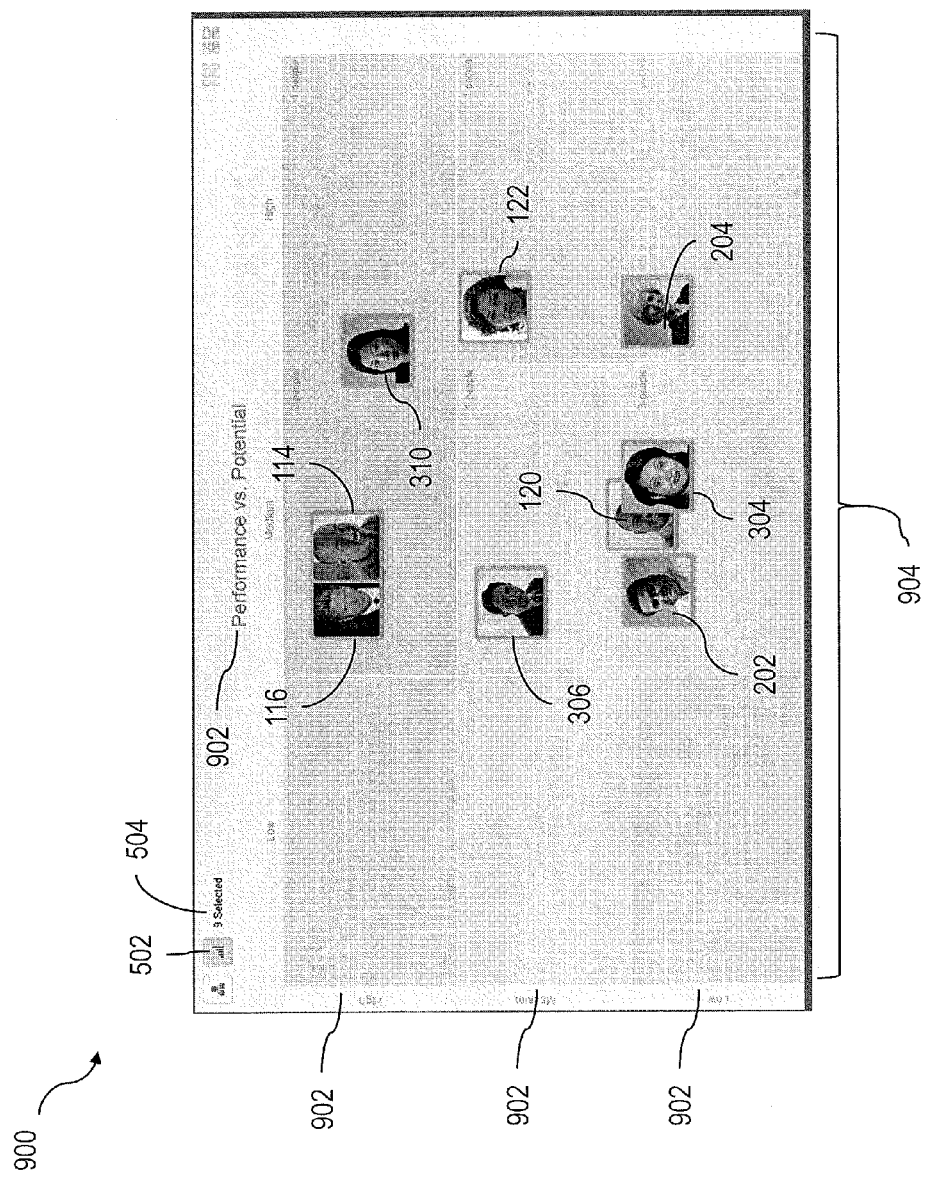
FIG. 9 shows another screenshot view illustrating features consistent with one or more implementations of the current subject matter.
Figure 10:
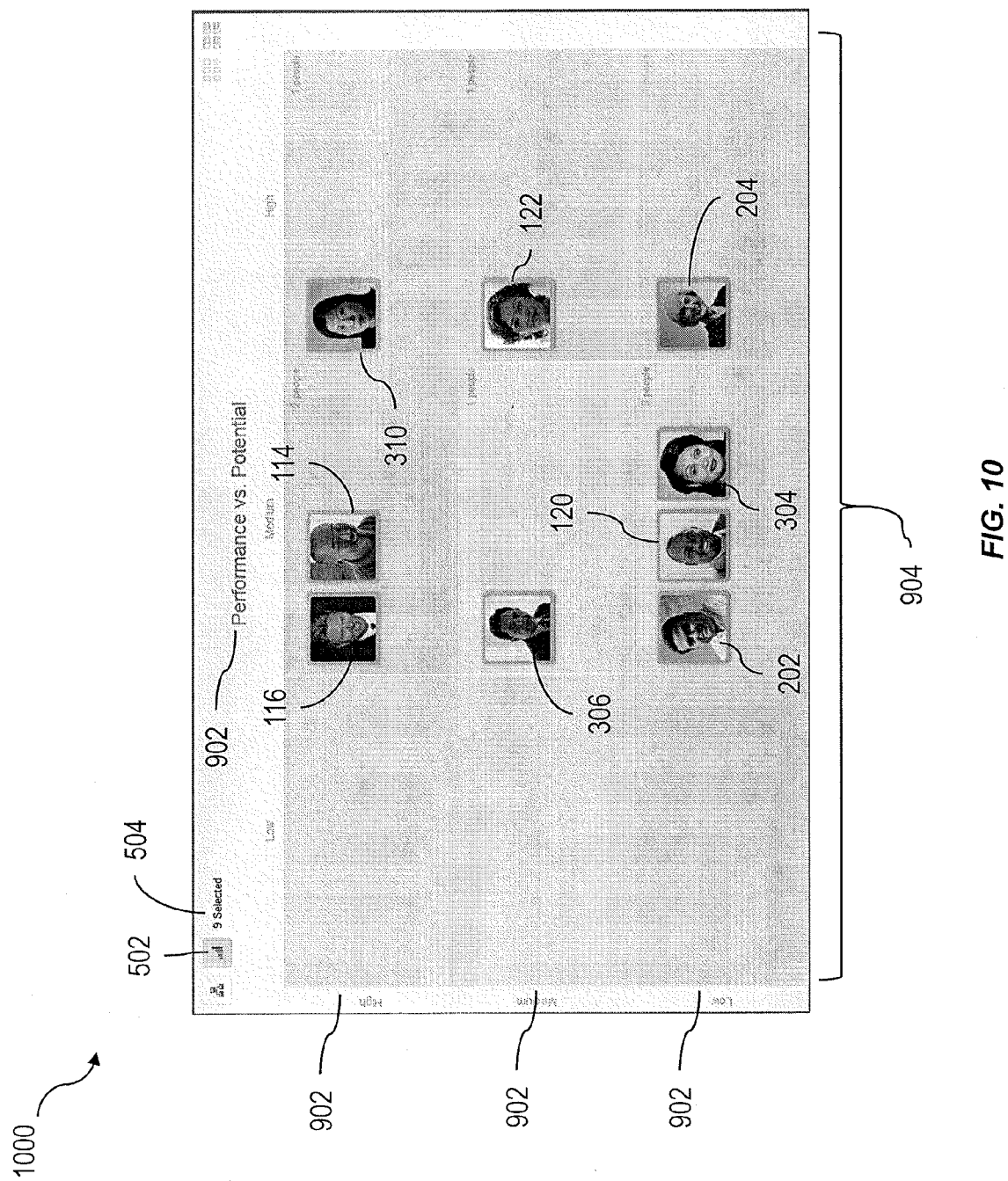
FIG. 10 shows another screenshot view illustrating features consistent with one or more implementations of the current subject matter.

FIG. 9 and FIG. 10 show two additional screenshot views 900 and 1000 illustrating the morphing effect from an organizational chart view to an analytical view. As shown in FIG. 9, one or more background graphic elements 902 (e.g. row and column labels, a title, a table grid pattern, etc. as shown in FIG. 9 and FIG. 10 and/or one or more other background graphic elements) of the analytical view 904 can fade into view, for example behind the still-displayed icons 114, 116, 120, 122, 202, 204, 304, 306, and 310 of the selected population. The icons 114, 116, 120, 122, 202, 204, 304, 306, and 310 of the selected population can also transition from their arrangement in the organizational chart view 102 to new positions in the analytical view 904. For example, the icons 114, 116, 120, 122, 202, 204, 304, 306, and 310 can be displayed in motion to new locations on a screen via animation showing them rearranging from their positions in the organization chart view 102 to the positions in the analytical view 904 shown in FIG. 10. In the example of FIG. 10, the analytical view 904 includes a matrix, and each grid area in the matrix includes a textual tally indicating how many icons (representative of people) are in each grid area.

Figure 11:
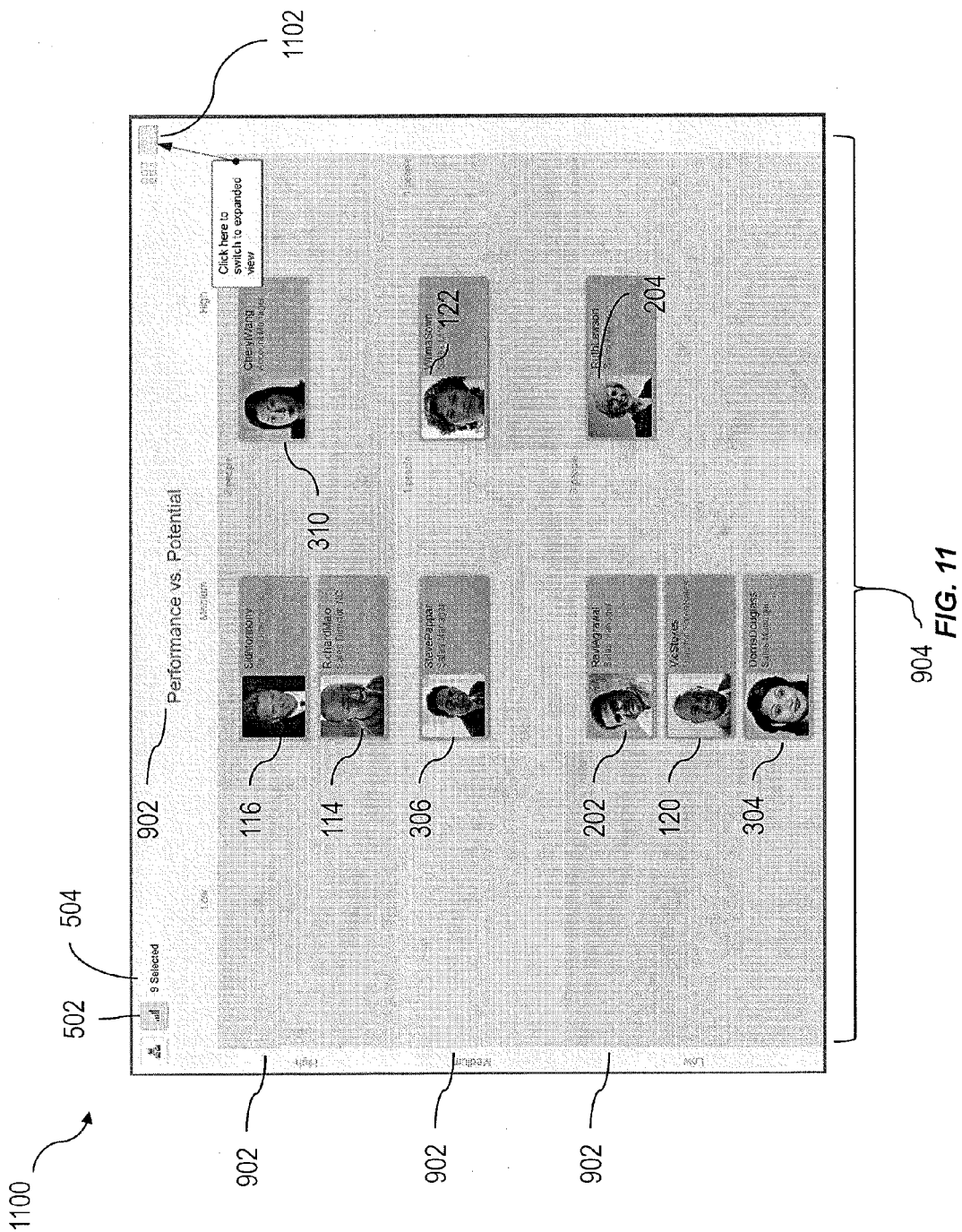
FIG. 11 shows another screenshot view illustrating features consistent with one or more implementations of the current subject matter.

As shown in FIG. 11, and additional detail control 1102 can be provided in an analytical view 904 to allow a user to change a level of detail displayed about each person represented by the icons in the selected population. The screenshot view 1100 illustrates a possible result of selection of added detail in the analytical view 904. Each icon 114, 116, 120, 122, 202, 204, 304, 306, and 310 can be augmented with details relating to the represented person, such as for example a title, a job level, a job description, a location, a number of years with the organization, or the like. As with other features described herein, in the event that a change in the level of detail displayed in association with each icon causes a need for rearrangement of the locations of the icons in the screen view, the icons can morph or otherwise move via an animation effect such that a screen refresh need not occur.

Figure 12:
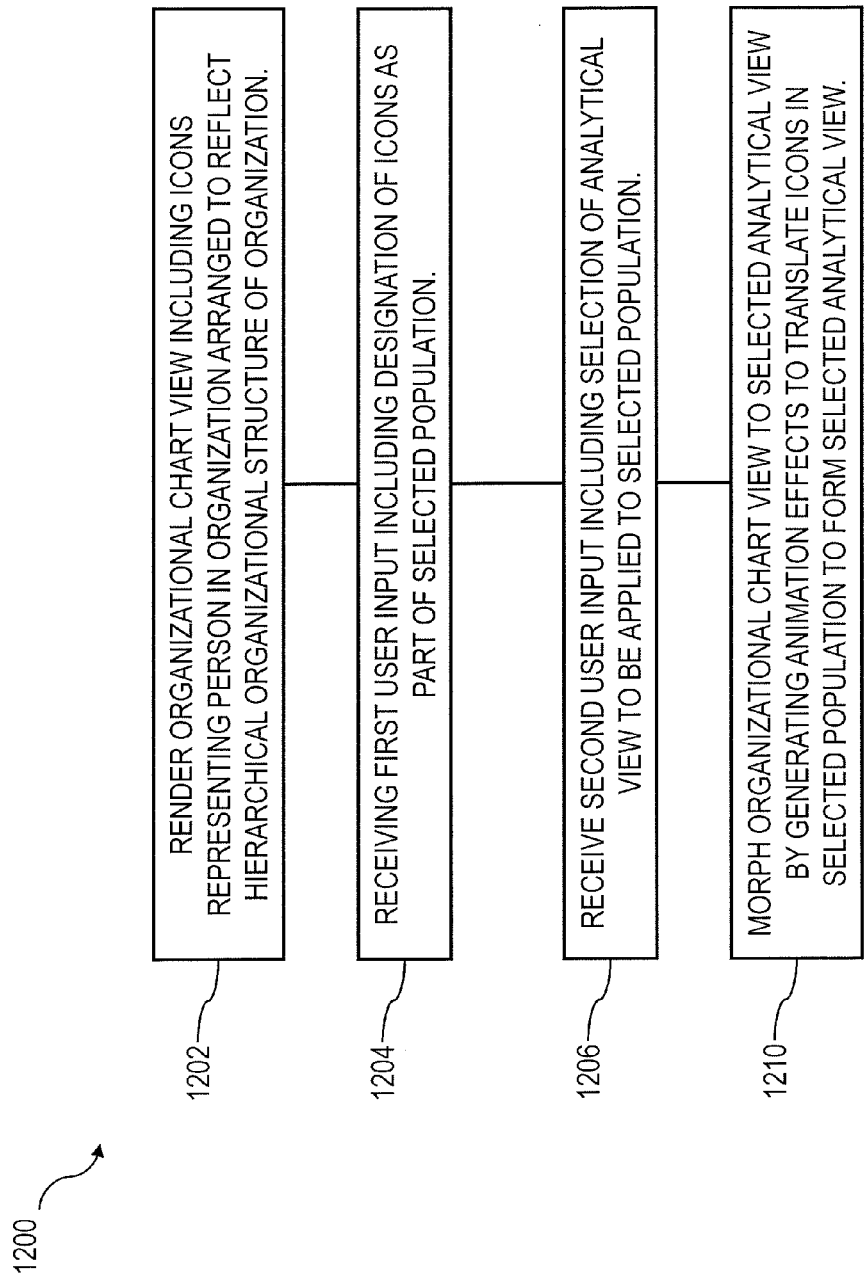
FIG. 12 shows a process flow diagram illustrating aspects of a method having one or more features consistent with implementations of the current subject matter.

FIG. 12 shows a process flow chart 1200 illustrating features of a method consistent with an implementation of the current subject matter. One or more of these features can be included in other implementations. At 1202, an organizational chart view is rendered for display on a display device. The organizational chart view includes a plurality of icons each representing a person in an organization. Consistent with the descriptions above, the plurality of icons is arranged to reflect a hierarchical organizational structure of the organization.

At 1204, a first user input is received. The first user input includes designation of two or more of the plurality of icons as part of a selected population. Consistent with the descriptions above, the first user input can include, among other possibilities, creation of a drag selection area that overlaps at least one of the two or more of the plurality of icons. The first use input can also include creation of a second drag selection area, optionally in conjunction with a key press on a keyboard, a right click, a touch pad or touch screen gesture, etc.

A second user input is received at 1206. The second user input includes a selection of an analytical view to be applied to the selected population, and can optionally be entered via a control 502 and pull-down menu 504 as discussed above.

The organizational chart view is morphed to the selected analytical view at 1210. Consistent with the descriptions above, the morphing includes generating animation effects to translate the plurality of icons in the selected population to form the selected analytical view. The morphing can be performed without a page reload such that a user can visually track the translating of the plurality of icons in the selected population as they form the selected analytical view. Also possible is a return to the organizational chart view. This returning can include morphing the analytical view back to the organizational chart view. A new user input that includes a change to the selected population can be received, and upon a new second user input (e.g. of the same analytical view or another analytical view), the organizational chart can be morphed to the desired analytical view.

Also within the scope of the current subject matter is receipt of a third user input that includes a new selection of a different analytical view to be applied to the selected population. The analytical view can then be morphed to the different analytical view without requiring new user designation of the selected population.

Figure 13:
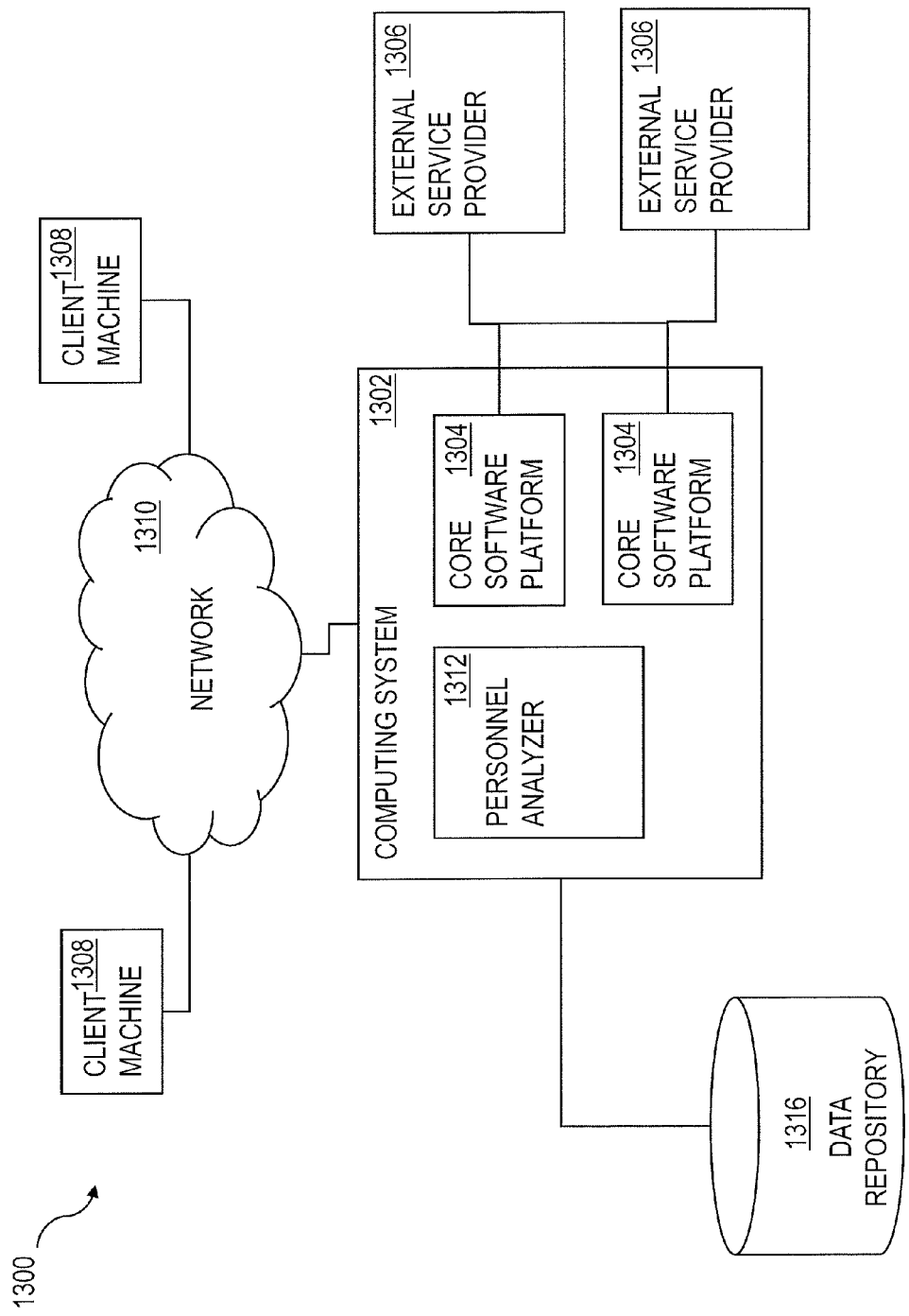
FIG. 13 shows a diagram illustrating aspects of a system showing features consistent with implementations of the current subject matter.

FIG. 13 shows a diagram of a system consistent with implementations of the current subject matter. A computing system 1302 can include one or more core software platform modules 1304 providing one or more features of a business software framework, such as for example an enterprise resource planning (ERP) system or the like. The computing system 1302 can also aggregate or otherwise provide a gateway via which users can access functionality provided by one or more external service providers 1306. Client machines 1308 can access the computing system, either via a direct connection, a local terminal, or over a network 1310 (e.g. a local area network, a wide area network, a wireless network, the Internet, or the like). Implementations of the current subject matter can include computing systems 1302 that are located in a single installation location and that include one or more programmable processors. Also within the scope of this disclosure are distributed computing systems 1302, in which multiple processor cores, either located in a same place or accessible via "the cloud." Multi-tenant arrangements in which multiple, isolated computing tenants are implemented on a common system are also within the scope of the current subject matter.

A personnel analyzer 1312 can be hosted on the computing system 1302 or alternatively, on an external system accessible over a network connection. The personnel analyzer 1312 can optionally include one or more discrete software and/or hardware modules that perform operations such as those described herein. The personnel analyzer 1312 can access one or more data repositories 1316 (e.g. process repositories, scenarios repositories, transactional data repositories, employee databases, etc.) that can store, among other records, master data about persons in an organization, human resources data, definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, data can optionally be organized into business objects.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transient machine-readable medium storing instructions that, when executed by at least one programmable processor, cause the at least one programmable processor to perform operations comprising:

rendering, for display on a display device, an organizational chart view, the organizational chart view comprising a plurality of icons each representing a person in an organization, the plurality of icons being arranged to reflect a hierarchical organizational structure of the organization;

receiving a first user input, the first user input comprising designation of two or more of the plurality of icons as part of a selected population;

receiving a second user input, the second user input comprising a selection of an analytical view to be applied to the selected population;

morphing the organizational chart view to the selected analytical view, the morphing comprising generating animation effects to translate the plurality of icons in the selected population to form the selected analytical view by displaying the plurality of icons in the selected population in motion such that a user can visually track the translating of the plurality of icons in the selected population as they form the selected analytical view;

receiving a third user input, the third user input comprising a new selection of a different analytical view to be applied to the selected population; and second morphing the analytical view by moving the two or more of the plurality of icons from first screen positions in the analytical view to second screen positions in the different analytical view without requiring new user designation of the selected population, the second morphing in response to the received third user input.

2. The computer program product of claim 1, wherein the first user input and the second user input are received via at least one user input device.

3. The computer program product of claim 1, wherein the first user input comprises creation of a drag selection area that overlaps at least one of the two or more of the plurality of icons.

4. The computer program product of claim 1, wherein the operations further comprise:

returning to the organizational chart view, the returning comprising morphing the analytical view back to the organizational chart view; and receiving a new user input, the new user input comprising a change to the selected population.

5. A system comprising:

at least one programmable processor; and a non-transient machine-readable medium storing instructions that, when executed by the at least one programmable processor, cause the at least one programmable processor to perform operations comprising:

rendering, for display on a display device, an organizational chart view, the organizational chart view comprising a plurality of icons each representing a person in an organization, the plurality of icons being arranged to reflect a hierarchical organizational structure of the organization;

receiving a first user input, the first user input comprising designation of two or more of the plurality of icons as part of a selected population;

receiving a second user input, the second user input comprising a selection of an analytical view to be applied to the selected population;

morphing the organizational chart view to the selected analytical view, the morphing comprising generating animation effects to translate the plurality of icons in the selected population to form the selected analytical view by displaying the plurality of icons in the selected population in motion such that a user can visually track the translating of the plurality of icons in the selected population as they form the selected analytical view;

receiving a third user input, the third user input comprising a new selection of a different analytical view to be applied to the selected population; and second morphing the analytical view by moving the two or more of the plurality of icons from first screen positions in the analytical view to second screen positions in the different analytical view without requiring new user designation of the selected population, the second morphing in response to the received third user input.

6. The system of claim 5, wherein the first user input and the second user input are received via at least one user input device.

7. The system of claim 5, wherein the first user input comprises creation of a drag selection area that overlaps at least one of the two or more of the plurality of icons.

8. The system of claim 5, wherein the operations further comprise:

returning to the organizational chart view, the returning comprising morphing the analytical view back to the organizational chart view;

receiving a new user input, the new user input comprising a change to the selected population.

9. A computer-implemented method comprising:

rendering, for display on a display device, an organizational chart view, the organizational chart view comprising a plurality of icons each representing a person in an organization, the plurality of icons being arranged to reflect a hierarchical organizational structure of the organization;

receiving a first user input, the first user input comprising designation of two or more of the plurality of icons as part of a selected population;

receiving a second user input, the second user input comprising a selection of an analytical view to be applied to the selected population;

morphing the organizational chart view to the selected analytical view, the morphing comprising generating animation effects to translate the plurality of icons in the selected population to form the selected analytical view by displaying the plurality of icons in the selected population in motion such that a user can visually track the translating of the plurality of icons in the selected population as they form the selected analytical view;

receiving a third user input, the third user input comprising a new selection of a different analytical view to be applied to the selected population; and second morphing the analytical view by moving the two or more of the plurality of icons from first screen positions in the analytical view to second screen positions in the different analytical view without requiring new user designation of the selected population, the second morphing in response to the received third user input.

10. The computer-implemented method of claim 9, wherein the first user input and the second user input are received via at least one user input device.

11. The computer-implemented method of claim 9, wherein the first user input comprises creation of a drag selection area that overlaps at least one of the two or more of the plurality of icons.

12. The computer-implemented method of claim 9, wherein the operations further comprise:

returning to the organizational chart view, the returning comprising morphing the analytical view back to the organizational chart view;

receiving a new user input, the new user input comprising a change to the selected population.

13. The computer-implemented method of claim 9, wherein at least one of the rendering, the receiving of the first input, the receiving of the second input, and the morphing is performed by a system comprising at least one programmable processor.

14. The computer program product of claim 1, further comprising simultaneously displaying, on a computer screen, at least two of the plurality of icons in the selected population rearranged from first positions in the organizational chart view to second positions in the selected analytical view corresponding to a comparison, based on at least one metric, between the at least two of the plurality of icons.

* * * * *